April 14, 1959     N. H. FAYERWEATHER     2,882,118
RECTILINEAR RECORDER
Filed May 6, 1954                                  3 Sheets-Sheet 1
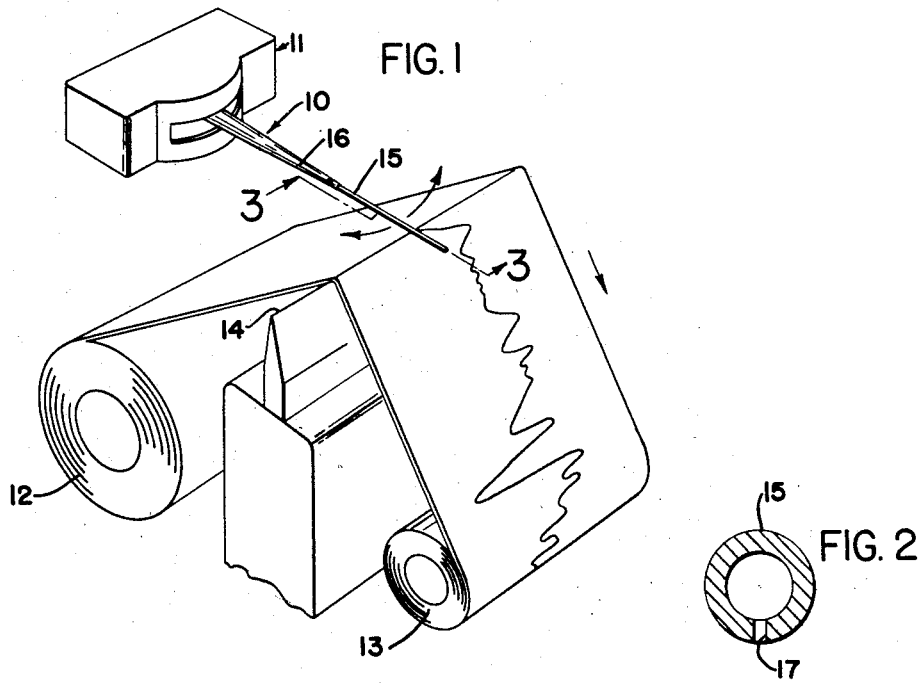
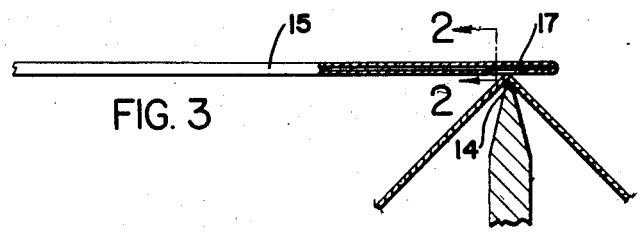
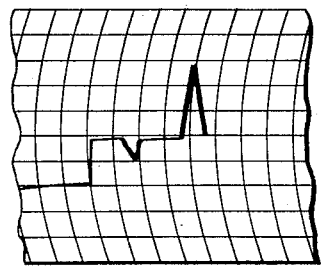
*INVENTOR.*
NEUMAN H. FAYERWEATHER
BY
ATTORNEYS April 14, 1959 N. H. FAYERWEATHER 2,882,118
RECTILINEAR RECORDER
Filed May 6, 1954 3 Sheets-Sheet 2
FIG. 5
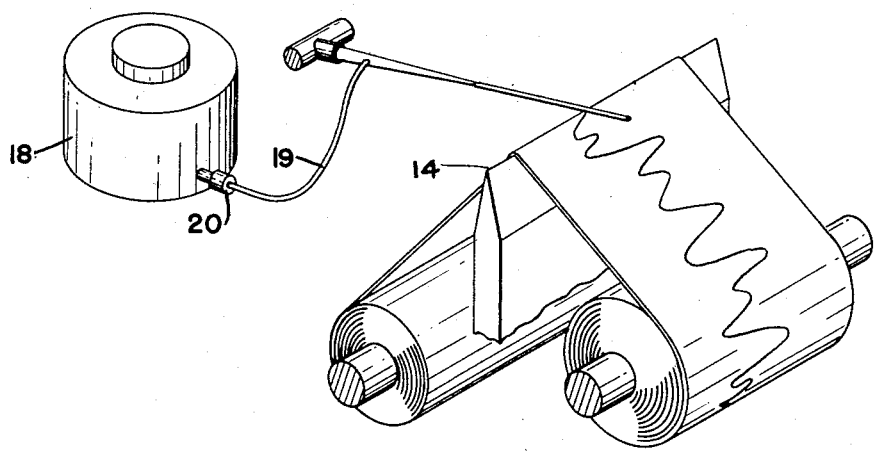
FIG. 6
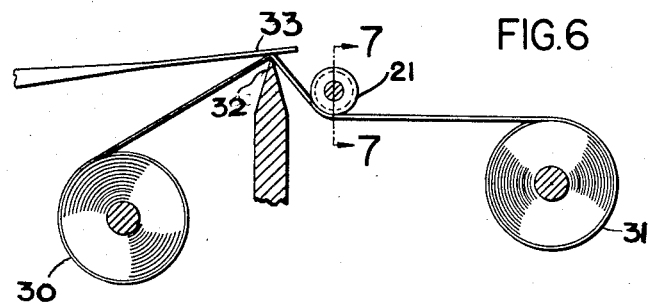
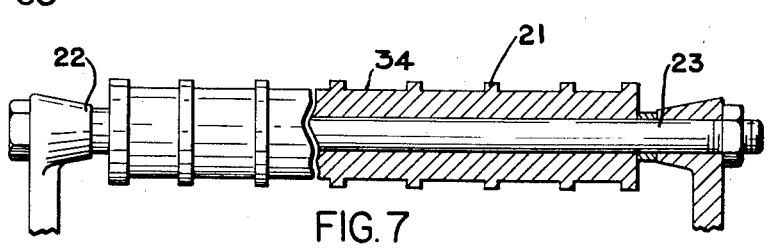
FIG. 7
INVENTOR.
NEUMAN H. FAYERWEATHER
BY
*Fay & Fay*
ATTORNEYS

*INVENTOR.*
NEUMAN H. FAYERWEATHER
BY Fay & Fay
ATTORNEYS

United States Patent Office 2,882,118
Patented Apr. 14, 1959

2,882,118

RECTILINEAR RECORDER

Neuman H. Fayerweather, Lakewood, Ohio

Application May 6, 1954, Serial No. 427,914

1 Claim. (Cl. 346—117)

This invention, relating as indicated to a rectilinear recording instrument, is particularly directed to a recording pen and data system which may convert arctilinear movements from a small, relatively powerful galvanometer activated by pulse data, such as stresses and strains, to rectilinear co-ordinates. This is particularly necessary in connection with analog and digital computers, as it is extremely difficult to properly analyze the data from such records if it is arctilinear rather than rectilinear.

Further, this is a particular improvement over various types of recording instruments which convert arctilinear data into rectilinear data of the general type disclosed in the Nichols Patent No. 2,308,710 and the Hildebrandt Patent No. 2,537,137.

Generally, at the present time, there is a great need for data from various pulsating sources to be recorded on data sheets and fed into computers and the like, but such data may be at frequencies up to 100 cycles per second and there may be a need for recording this data at linear speeds up to 125 millimeters per second. Because of the nature of the movements in the galvanometer as it is transferred to the paper, the recording pens are of a complex nature and are not suitable for functioning over a wide variety of conditions. One frequently used type is the electrical instrument which uses a black paper covered with a white wax. This instrument melts the wax recording a trace but is limited in its charactistics in that a rapid swing in a function, such as a step function, having a square wave, may not be accurately recorded as there is insufficient time to melt the wax over the rapid traverse trace of the recording head. Other difficulties are experienced when the paper speed is changed and when the data stops for a few moments.

Still another type of recording system has been the attempt to convert arctilinear data to rectilinear data by having an arm of a galvanometer and a means, such as a thread, for converting this to rectilinear co-ordinates. Almost all of these instruments have been of heavy construction and have not responded to the wide range of frequencies required in this work. i.e., they might be useful in the range up to 3 to 4 cycles per second, which is considered very slow, and were not even useful up to the frequenicies at which the heated stylus previously mentioned could be used. These recorded in the range up to 30 to 35 cycles per second. However, ranges up to and including 100 cycles per second are necessary, and a very lightweight recording pen which would have a very low moment of inertia was required. The pen of this application and this combination is of this type.

An object of this invention is to develop a very lightweight recording pen and rectilinear recording system capable of converting arctilinear data to rectilinear co-ordinates. A further object of this invention is to produce an accurate rectilinear recording pen and system from arctilinear data which will reproduce the data for analog and digital computers, and do so with an accuracy that does not distort the movements either in the longitudinal or transverse plane and does not skip on rapid transverse movements of the pen.

Other objects and advantages of the invention will be apparent from the following description of a preferred form of the invention, reference being made to the accompanying drawings wherein:

Fig. 1 is a schematic view of the rectilinear recording pen and system disclosed herein;

Fig. 2 is a cross-sectional view along the lines 2—2 of Fig. 3 through the tip of the pen, greatly magnified of course;

Fig. 3 is a cross-sectional view along the line 3—3 of Fig. 1 through the pen and the knife edge over which the recording paper passes;

Figure 8:
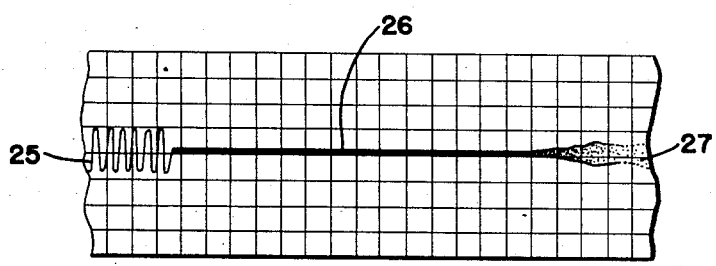
Figure 9:
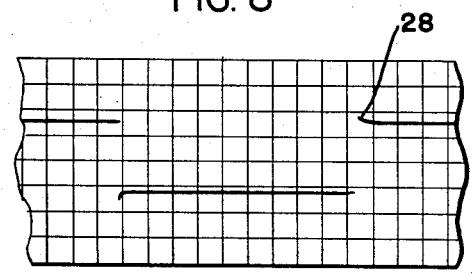
Figure 10:
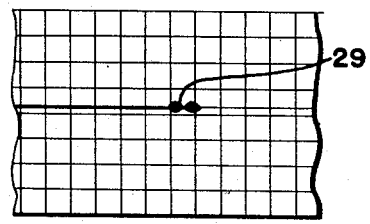
Figure 11:
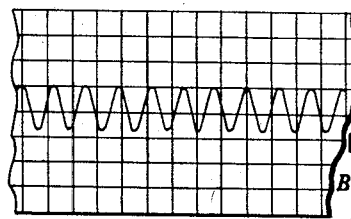

Fig. 4 presents a view of a graph made by a common type of arctilinear recording system;

Fig. 5 is a large scale view of the inking pen and recorder combination;

Fig. 6 is a cross-sectional view of a flat-topped recorder;

Fig. 7 is a cross-sectional view along the lines 7—7 of Fig. 6;

Figs. 8–11 are figures of a rectilinear recording system using a heated stylus;

Fig. 8 is particularly a change from a large amplitude, fairly high frequency data input to one in which the amplitude is very slight, and the speed reduces, producing a complete heavy black line across the paper;

Fig. 9 is a step function showing the massing trace;

Fig. 10 is an example of the data stopping, producing a burned spot on the paper; and Fig. 11 is a considerably darkened view of a very high frequency data input at very high speeds up to 125 millimeters per second; however, the trace in the original was hardly visible at these speeds.

This invention consists of a rectilinear recording system and pen therefor, said pen being shown generally at 10, and a very small high powered recording galvanometer shown generally at 11. In this system there is further a roll of paper with rectilinear co-ordinates, said roll shown at 12, and a take-up roll shown at 13, said roll passing over a knife edge shown at 14. The edge extends beyond the width of the paper. The recording paper may, of course, be single channel or multiple channel, in which event a series of data strips are contiguous with one another and more than one recording galvanometer is used with the apparatus. The recording paper moves from the original roll to the take-up roll at 13, passing over the knife edge.

The pen is composed of a metallic tube 15 of very low moment of inertia, said tube being of the finest diameter that is possible and having a slot shown at 17 cut on the underside thereof for a length of about ⅜ of an inch or slightly more, the slot being about .002 inch, and produces a trace on the paper over the knife edge which is of about the same width, which is fairly constant as rapid swings on the paper are made.

Since the knife edge is about the same width as the slot the tendency is for the trace to remain fairly constant, but actually, however, it will increase as the diameter of the trace would be the elongated length of the slot, which would be slightly greater than the ordinary trace during only slight changes in angular position.

This is just the opposite of the trace using a heated stylus since rapid angular changes are produced in very short time intervals and there is no time at all to melt the wax in these recording techniques. These pictures are illustrated particularly in Fig. 9.

Returning to the drawings, the knife edge is 14 and in Fig. 3 it will be seen that said knife edge is about the width at the top as the width of the slot 17. In connection with Fig. 5, 18 shows a reservoir removed from and not connected with the recording pen. 19 shows a flexible tube for the ink, which is connected to the pen. At 20 there is a restriction in the junction between the inking reservoir and the flexible tube, which restriction is of reduced cross-sectional area, so that the flow of ink through this restriction is considerably less than the flow of ink through the elongated inking slot. By this means at high frequency fluctuation there is not a tendency to increase the flow of ink out of the pen, but rather to have it metered by the restriction at the reservoir. Rapid swings of the recording pen will create a centrifugal force which will pull the ink out of the reservoir at some speed and will increase the width of the ink trace. For accuracy in reproducing the trace this has been found to be very important. A further distinction is that the level of the ink in the reservoir at the top of the reservoir is below the inking slot 17. By this means there will be a capillary action to draw the ink from the inking reservoir, and excessive ink will not be forced out by the changing level of ink in the reservoir and by the high frequency fluctuations of the pen.

In the preferred position the pen is sloped at an angle of 10 to 15 degrees with respect to the horizontal and the ink will be drawn to the paper by the capillary action.

Fig. 4 is a view of an arctilinear recording system showing the kinds of traces that are made with this system and the nature of the wider trace as the arm moves both linearly and transverse to the paper, and its direction of movement.

Fig. 5 is a schematic view of the recording system of this invention, which has been previously described, and may be used either for single or multiple channel recorders, though only one is shown here.

Fig. 6 is a cross-sectional view of the general scheme of this invention in a flat-topped recorder, in which the paper may be viewed when in a horizontal position. This necessitates a supply of paper on the roll at 30, a take-up roll at 31, a knife edge 32, and the recording pen 33. There is an additional roller 21 adjacent the knife edge so that the paper may be sharply depressed over the knife edge to make a fine trace. Said additional roller is only necessary in a flat-topped recorder. Said roller 21 is supported by a pilot on either side at 22 and 23. The roller has its lowermost portion at least below the plane of the knife edge, so that if the paper is drawn over the knife edge it contacts the lower edge of the roller. Said roller 21 has segmental portions which are depressed from the outer circumferential surface of the roller as shown at 34. The ink trace of the roller would smear if passed in direct contact with the roller, and so the ink trace is lifted from the roller by the support means of the roller and the depressions 34 do not contact the inked surface. In some types of data recording systems the sloped top recorder may not require this construction, but for flat type recorders and instruments this would be necessary. However, because of the high speeds of travel, the paper would smear, and, accordingly, this combination of a roller having a recessed portion 34, which is approximately covered by the movement of the recording pen, will prevent smearing of the trace.

Some of the difficulties in the prior art are now described:

Figs. 8 to 11 illustrate the various problems in connection with a heated stylus, and particularly in connection with Fig. 8 the trace will be seen moving from left to right. At first there is a rapid fluctuation, perhaps a sinusoidal fluctuation at one frequency, and then it changes to a lower amplitude and slower speed, and produces a blurred portion, indicating that the trace is indistinguishable during this section. As the amplitude and speed increases, the trace itself may be seen again at 27. The center portion was shown at 26 and the initial portion at 25.

In Fig. 9 is shown an example of a step function, sometimes known as a square wave, and the quick lateral trace could not be recorded because there was insufficient heat to make a trace. If the heating of the stylus had increased, then the regular trace would have been too heavy. This invention overcomes this difficulty. The change from the square wave laterally is shown at 28.

Fig. 10 is a view where the trace stopped with the heated stylus, producing a black dot 29.

Fig. 11 had to be darkened considerably, but under normal conditions the heated stylus is set at one temperature or at one voltage. Under these conditions, when the trace speeds up, as may be required, the adjustments have to be changed so that the trace is readily visible. As the trace increases in these views to Fig. 11, there is insufficient heat to produce a full trace and, as seen in the original, this would be a very dim line since it is fluctuating at a fairly high frequency and at considerable linear speed. This is one of the difficulties of the heated stylus.

This invention, then, combines a pen, perhaps 4 inches or more in length, which is very light in weight, involving a thin tube of metal, said tube having a narrow slot about .002 inch at the end thereof extending over ⅜ of an inch, more or less. The pen traverses through an arc of 10 to 15 degrees to one side or the other and contacts the knife edge 14, as mentioned earlier, producing a trace on a recording paper. Multiple or single channels may be used. This instrument will record and produce accurately even though the linear speed may vary from zero to 125 millimeters per second, which is perhaps the highest recording speed today, and it will do this when the frequency is up to 100 cycles per second, and will produce a continuous trace, the width of the trace being approximately the same throughout its length even though the impulses may swing in a square wave, i.e., step wave, which is from positive to negative over a short interval of time.

Other types of recording techniques have been shown to produce a rectilinear trace, and examples of these were cited earlier. However, in general, most of the rectilinear recording systems are incapable of reproducing frequencies greater than 3 or 4 cycles per second. That is one of the reasons why this particular development has been superseded by the heated stylus techniques. In the frequency ranges covering the entire band up to 100 cycles per second, these rather slow and cumbersome instruments are not capable of accomplishing the purpose. This invention is particularly directed to an instrument for recording stresses, strains or pressures which rapidly fluctuate or pulsate. It will do so at speeds indicated of 125 millimeters per second, and is of such a design that the recording galvanometer may move rapidly over the entire range of 30° of arcuate movement to produce a rectilinear trace which is of constant width. The slight mass of the instrument and the rather small amount of materials and ink in the instrument at any one time, together with the restrictions to the flow, permits this rapid fluctuation without counterbalances which produce other disastrous effects and a damping action.

To the accomplishment of the foregoing and related ends said invention, then, consists of the means hereinafter fully described and particularly pointed out in the claim; the following description setting forth in detail one approved method of carrying out the invention, such disclosed method, however, constituting but one of the various ways in which the principle of the invention may be used.

I claim:

In an apparatus for recording rectilinear movement from an arctilinear source, said apparatus comprising an instrument for recording pulses and converting them to an arctilinear movement in a galvanometer, an elongated arm of very low moment of inertia, a recording pen on said arm, the tip of said pen having a narrow slot on the underside thereof, a knife edge immediately beneath said slot and approximately transverse thereto, a roller spaced from and positioned below the level of the knife edge, means for moving the recording paper over said knife edge and causing the paper to pass under said roller, said roller being characterized by recessed portions between the limits of the arcuate movement of the recording pen on the paper, whereby the paper is spaced from the roller throughout the limits of the arcuate movement of the recording pen in order to permit the ink to dry, said recording pen being connected to an inking reservoir by means of a flexible tube, the upper level of said inking reservoir being below the level of the slot on the recording pen, a restriction in said tube adjacent said inking reservoir permitting the passage of ink therethrough, the cross-sectional area of said restriction being smaller than the cross-sectional area of the slot in the recording pen in the plane of the recording paper.

References Cited in the file of this patent

UNITED STATES PATENTS

| | | |
|---|---|---|
| 1,179,925 | Hull | Apr. 18, 1916 |
| 2,509,185 | Eckel | May 23, 1950 |
| 2,519,341 | Barstow | Aug. 22, 1950 |
| 2,537,137 | Hildebrandt | Jan. 9, 1951 |
| 2,646,336 | Edinburg | July 21, 1953 |